No. 653,310. Patented July 10, 1900.
O. J. NUGENT.
SIDE DELIVERY HAY RAKE.
(Application filed July 28, 1899.)

(No Model.) 2 Sheets—Sheet 1.

Witnesses:
M. R. Ramley
H. C. Rodgers

Inventor:
O. J. Nugent

By Higdon, Fischer & Thorpe
attys.

THE NORRIS PETERS CO., PHOTO-LITHO., WASHINGTON, D. C.

No. 653,310. Patented July 10, 1900.
O. J. NUGENT.
SIDE DELIVERY HAY RAKE.
(Application filed July 28, 1899.)
(No Model.) 2 Sheets—Sheet 2.
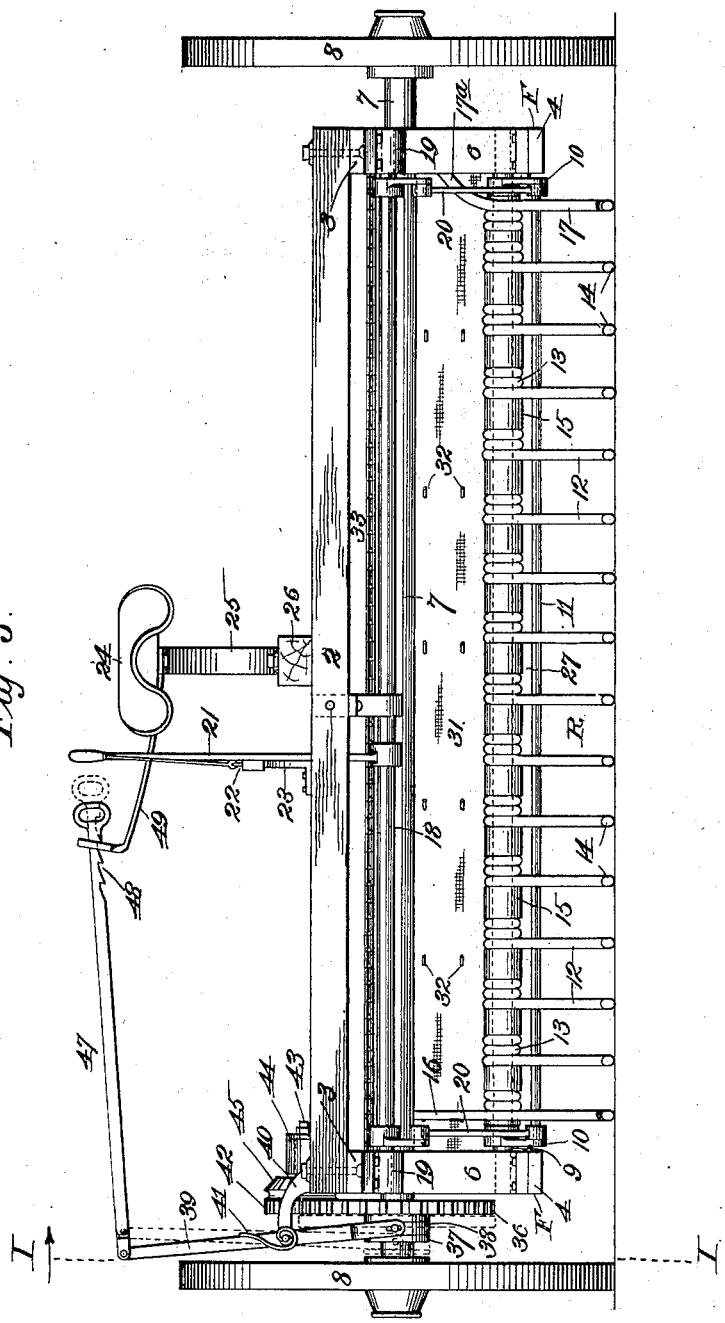
Witnesses:
Inventor:
O. J. Nugent.
By Higdon, Fischer & Thorpe
Attys.

UNITED STATES PATENT OFFICE.

OTIS J. NUGENT, OF HIAWATHA, KANSAS.

SIDE-DELIVERY HAY-RAKE.

SPECIFICATION forming part of Letters Patent No. 653,310, dated July 10, 1900.

Application filed July 28, 1899. Serial No. 725,363. (No model.)

*To all whom it may concern:*

Be it known that I, OTIS J. NUGENT, residing at Hiawatha, in the county of Brown and State of Kansas, have invented a new and useful Improvement in Side-Delivery Hay-Rakes, of which the following is a specification.

My invention relates to side-delivery hay-rakes; and my object is to produce a machine of this character which will reliably gather up the hay in its path and deposit it in uniform windrows extending parallel to the line followed by the machine in its passage over the field.

A further object is to produce a machine of this character of simple, strong, durable, compact, and inexpensive construction.

To these ends the invention consists in certain novel and peculiar features of construction and combinations of parts, as will be hereinafter described and claimed, and in order that the invention may be fully understood, reference is to be had to the accompanying drawings, in which—

Figure 1:
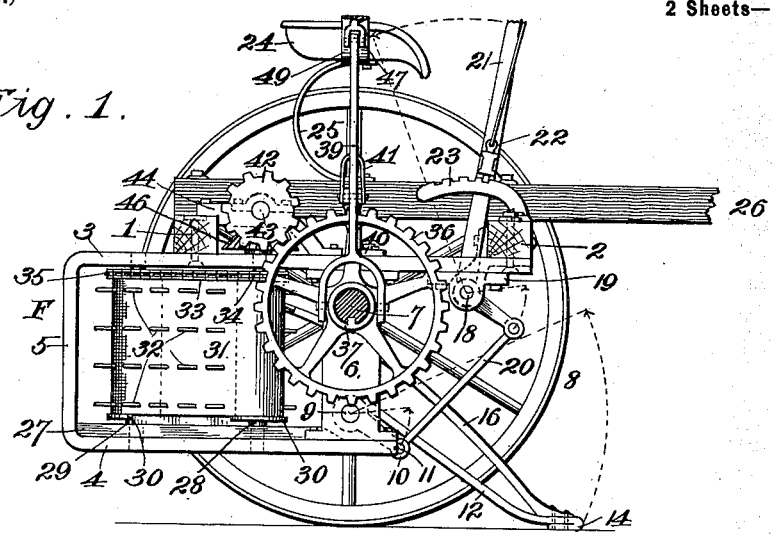
Figure 2:
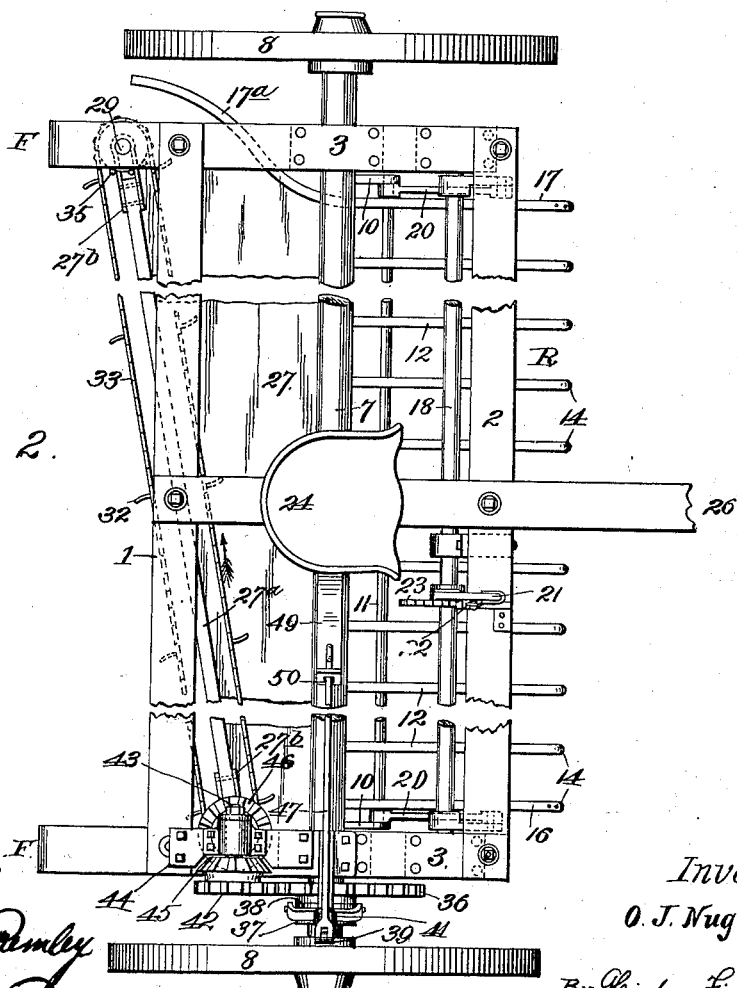

Figure 1 represents a vertical section taken on the line I I of Fig. 3. Fig. 2 is a plan view of the machine. Fig. 3 is a front view of the machine, the tongue only being in section. Fig. 4 is a sectional perspective view of the rake.

In the said drawings, wherein like numerals and letters of reference refer to corresponding parts, the wheeled frame of the machine is constructed as follows:

1 2 designate a pair of parallel transverse bars arranged at a suitable distance apart and connected at their ends by the upper or longer arms 3 of frames F, preferably of metal, and embracing also the parallel lower arms 4 and the connecting end arms 5.

6 designates standards connecting frame-arms 3 and 4, and 7 a shaft journaled in said standards and forming the axle for and adapted to be driven by the carrying-wheels 8.

9 designates a smaller parallel shaft journaled in the lower ends of said standards and provided with crank-arms 10, connected by a lifting-rod 11, for throwing the rake R to its inoperative position, said rake consisting of a plurality of equidistant teeth in the form of rods 12, bent at their rear ends to form coils or eyes 13, loosely mounted on crank-shaft 9 and extending forward and downward to a point near the ground and forwardly from such point in a plane approximately parallel with the ground a sufficient distance to efficiently gather up the hay in their path, as hereinafter explained, the front ends being bent back underneath the body portion, as shown at 14, in order that the rake may more readily ride over small obstructions or inequalities in the surface of the ground. The rake-teeth have an independent vertical movement on the crank-shaft 9 and are maintained at the requisite distance apart by the spacing-rollers 15 upon said shaft, which rollers, in a manner which hereinafter appears, facilitate the discharge of the hay off the rear end of the rake. The rake at its opposite ends is provided with skeleton guard-rods 16 and 17, secured by rivets or in any other suitable manner to the endmost teeth 12, and extending upward and rearward for a purpose which will be hereinafter explained, the guard-rod 17 being provided with a curved extension 17$^a$, terminating adjacent to the rear portion of the contiguous wheel 8 and serving to prevent the hay as it is discharged from the machine from coming in contact with the said wheel.

18 designates a crank-shaft journaled in boxings 19, secured to the front end of arms 3, the cranks of said shaft being pivotally connected by links 20 with the crank-arms 10 of shaft 9. Crank-shaft 18 is provided with a crank-handle 21, having the customary dog 22 for engagement with the notched sector 23, secured to the transverse bar 2. This lever is within convenient reach of the driver upon seat 24, secured to the upper end of spring-support 25, bolted or otherwise secured to the tongue 26 of the vehicle, the tongue being bolted rigidly to bars 1 and 2.

By reference to the drawings it will be noticed that the rake-lifting rod 11 underlies the rake-teeth, and that in consequence the proper manipulation of lever 21 will raise the rake-teeth, and therefore throw the rake to an inoperative position, and that by reversing such manipulation of the lever the rake will be caused by gravity to resume its original or operative position.

Under proper proportional construction a small space will intervene between the liftrod and each rake-tooth in order that said teeth may individually descend on encountering a cavity or depression in their path, and therefore insure a thorough raking operation.

27 designates a platform connecting the lower arms 4 of frames F and preferably provided at its rear edge with a vertical and obliquely-extending wall or flange $27^a$, formed with clips $27^b$ at its ends. The object of this wall is hereinafter referred to, but it is to be understood that it is not an indispensable element of the machine. Journaled in frames F are the vertical shafts 28 and 29, the former being located in front of the latter and both provided with enlargements or rollers 30, flanged at their lower ends in order that the obliquely-extending belt or apron 31 connecting the rollers may be prevented from sliding downward on the rollers, and in order that this belt may be positive and reliable in its conveyance of the hay, in a manner hereinafter explained, it is provided with a plurality of outwardly-projecting pins or hooks 32. The slippage of the belt is also guarded against by the sprocket-chain 33, preferably secured at its upper end to the belt or apron and engaging sprocket-wheels 34 and 35 upon shafts 28 and 29, respectively. Said shafts also serve as a support or brace for the vertical wall $27^a$, hereinbefore described, by extending up through the clips $27^b$, (see Fig. 2) it being desirable to brace said wall because it serves to limit the distance which the front of the belt can yield under the heavy pressure of the hay as it accumulates on the machine. In order to throw this conveyer in and out of gear with the drive shaft or axle 7, the following mechanism is provided: 36 designates a large sprocket-wheel having a laterally-projecting hub 37 and keyed to slide upon and rotate with shaft 7, said hub carrying the customary band 38, to which is pivoted the lower or bifurcated end of the lever 39, fulcrumed to the bracket 40, bolted or otherwise secured to the contiguous frame-arms 3, a spring 41, carried by the bracket 40, being utilized by engagement with said lever to hold the gear-wheel 36 in engagement with the small cog-wheel 42, secured rigidly on a short shaft 43, journaled in the bearing 44, secured to the framework of the machine. This cog-wheel 42 is formed integral with a bevel-gear 45, meshing with a similar bevel-gear 46, secured upon the upper end of conveyer-shaft 28.

In order to conveniently manipulate lever 39, and thereby throw the conveyer in or out of gear with the drive sprocket-wheel 36, a hand-bar 47 is pivoted to the upper end of lever 39 and near its handle end is provided in its under side with a series of ratchet-teeth 48, adapted for engagement with the locking-bar 49, secured to and projecting from the seat-standard or other convenient point, said locking-bar also serving as a guide for bar 47 by the provision of an opening 50, through which said hand-bar extends.

In the practical operation of the machine, supposing the parts to occupy the position shown in full lines in the drawings, it will be apparent that in driving across the field the loose hay will be gathered up and forced by its own accumulation upward and rearward upon the rake, and assisted by the frictionally-turned rollers 15 on shaft 9 will drop down upon the platform 27 and be crowded rearward against the conveyer, operating in the direction indicated by the arrow in Fig. 2. As the hay gathered up by the rake increases in quantity, it presses with sufficient force against said moving conveyer to cause the latter, through the operation of hooks 32, to continuously discharge it from the left-hand end of the machine between the conveyer and the curved extension $17^a$ of the rake in uniform quantity and in a line or windrow which parallels the course of the machine across the field.

In the operation of the machine it is obvious that the tendency of the hay just outside of the swath made by the rake and interlocked with the hay within said swath and gathered up by the rake will be to cling to and rise with the hay last referred to, but beyond the ends of the rake. Such effect would soon interfere with the free and proper operation of the machine, and in order to prevent it the guard-rods 16 17 are provided to elevate the interlocked hay so high that it will be lifted clear of the ground and its weight utilized in breaking such interlocked connection, and consequently cause the elevated hay beyond the ends of the rake to drop back upon the ground, one of said guard-rods being extended, as hereinbefore explained, for the purpose of holding the hay discharged by the conveyer away from the contiguous carrying-wheel.

In traveling to or from the field or to avoid encounter with a rock, tree-stump, or other projection which might inflict injury the driver grasps and operates lever 21 to elevate the rake a safe distance, the dog 22 and sector 23 being utilized to hold it elevated, if desired.

It is to be understood that although I have illustrated and described the preferred embodiment of my invention I reserve the right to make all changes which properly fall within its spirit and scope.

Having thus described the invention, what I claim as new, and desire to secure by Letters Patent, is—

1. A side-delivery hay-rake, comprising a wheeled frame, a rake carried thereby with its front end depressed so as to pass underneath the hay, and a driven endless conveyer mounted on vertical rollers in the wheeled frame and arranged to receive the hay as it is gathered up by the rake and forced by its own accumulation upward and backward against said conveyer, said conveyer then discharging the hay adjacent to one of the carrying-wheels, substantially as described.

2. A side-delivery hay-rake, comprising a wheeled frame, a rake carried thereby with its forward end depressed, a driven endless conveyer, mounted on vertical rollers, to receive the hay from the rake and discharge it adjacent to one of the carrying-wheels, and means to throw the rake to an inoperative position by elevating its front end, substantially as described.

3. A side-delivery hay-rake, comprising a wheeled frame, a rake carried thereby with its front end depressed, an endless conveyer mounted on vertical rollers and geared to one of the wheels of the frame to receive the hay from the rake and discharge it adjacent to one of the carrying-wheels, and means to throw said conveyer out of gear with said wheel, substantially as described.

4. A side-delivery hay-rake, comprising a wheeled frame, embodying a pair of vertical rectangular frames and a platform connecting their lower ends, a rake carried with its front end depressed, and a driven endless conveyer mounted on vertical rollers and arranged to receive the hay from the rake and discharge it adjacent to one of the carrying-wheels, substantially as described.

5. A side-delivery hay-rake, comprising a wheeled frame embodying a pair of vertical frames and a platform connecting their lower ends, vertical shafts journaled in said vertical frames, belt-rollers thereon carrying sprocket-wheels, an endless conveyer in the form of a belt and a sprocket-chain connecting said rollers and said sprocket-wheels, respectively, said belt being provided with hook-arms, means to operate said conveyer, and a pivoted rake having its front end depressed, substantially as described.

In testimony whereof I affix my signature in the presence of two witnesses.

OTIS J. NUGENT.

Witnesses:
  H. R. CHITWOOD,
  Mrs. W. H. CLARK.